United States Patent [19]

Melocik

[11] Patent Number: 4,804,893
[45] Date of Patent: Feb. 14, 1989

[54] ELECTRIC BRAKING CONTROL

[75] Inventor: Grant C. Melocik, Chardon, Ohio

[73] Assignee: Caterpillar Industrial Inc., Mentor, Ohio

[21] Appl. No.: 48,348

[22] Filed: May 11, 1987

[51] Int. Cl.⁴ .......................... H02P 3/10; H02P 5/17
[52] U.S. Cl. .................................. 318/258; 318/139; 318/269; 318/373
[58] Field of Search ............... 318/139, 255, 256, 257, 318/258, 261, 264, 265, 268, 269, 272, 273, 275, 280, 293, 599, 373

[56] References Cited

U.S. PATENT DOCUMENTS

| | | | |
|---|---|---|---|
| 3,843,912 | 10/1974 | Anderson | 318/258 |
| 3,872,365 | 3/1975 | Vignaud | 318/265 |
| 3,950,681 | 4/1976 | Kern | 318/258 X |
| 3,995,204 | 11/1976 | Konrad et al. | 318/373 X |
| 4,479,080 | 10/1984 | Lambert | 318/258 X |
| 4,518,902 | 5/1985 | Melocik et al. | 318/258 X |
| 4,529,919 | 7/1985 | Melocik et al. | 318/373 |
| 4,555,651 | 11/1985 | Melocik et al. | 318/139 X |
| 4,634,941 | 1/1987 | Klimo | 318/139 |

Primary Examiner—Bentsu Ro
Attorney, Agent, or Firm—Terry D. Morgan; Robert E. Muir

[57] ABSTRACT

An apparatus for an electric drive vehicle which provides linear deceleration via electrical braking. The apparatus monitors vehicle speed and adjusts the duty cycle of a chopper circuit according to look-up tables. These table correlate vehicle speed and desired deceleration rate to braking torque, thereby enabling the apparatus to maintain a preselected deceleration through the entire stopping distance and to precisely position the vehicle.

1 Claim, 4 Drawing Sheets

ELECTRIC BRAKING CONTROL

TECHNICAL FIELD

This invention relates generally to an apparatus for controllably decelerating a work vehicle and, more particularly, to an apparatus which employs electrical braking for linearly decelerating a work vehicle.

BACKGROUND

In the field of electric drive vehicles, electrical braking is a feature commonly utilized to slow the vehicle without applying the service brakes. This feature is accomplished by energizing the motor in a direction opposite to the immediate direction of rotation. For example, when a vehicle traveling in the forward direction is shifted into reverse, the control responds by energizing the motor at a constant excitation in the reverse direction. The constant excitation provides for a gradual nonlinear deceleration. As the speed of the motor armature decreases the constant excitation results in less armature current and a corresponding reduction in braking torque. Such nonlinear systems are adequate for operator controlled vehicles, as precise positioning via electrical braking is not required.

However, in the field of automatic guided vehicles (AGV) constant deceleration is an important tool in maintaining navigational accuracy. It is of paramount importance that the AGV be precisely positionable to allow the transported material to be deposited or collected at highly defined locations. The ease of predicting vehicle location during linear deceleration is apparent, owing to the single variable of time. Conversely, nonlinear deceleration unnecessarily complicates the navigational algorithms and while the possibility of constructing such a system exists, it is undesirable. Further, any simplifying assumptions to the nonlinear algorithm manifest in positional degradation.

Prior systems, such as U.S. Pat. No. 3,995,204 issued Nov. 30, 1976 to Konrad et al, have successfully closed the loop on armature current. By controlling armature current to a constant value during electrical braking the system can provide linear deceleration. Such a system suffers from the inherent disadvantages of additional circuitry. A closed loop current feedback system to a digital system necessarily requires a current sensor such as a calibrated resistor, amplifier circuitry, and an analog to digital converter. Increased cost as well as decreased reliability are obvious shortcomings to such an analog based system.

The present invention is directed to overcoming one or more of the problems as set forth above.

DISCLOSURE OF THE INVENTION

In one aspect of the present invention, an apparatus provides substantially constant deceleration of an electric drive work vehicle. The apparatus includes a battery, an electric drive motor having a field and armature winding, switching means for controllably interconnecting the battery and drive motor windings in response to receiving a control signal, means for sensing work vehicle speed and delivering a signal correlative thereto, means for detecting plugging of the drive motor and delivering a signal in response thereto, control means for receiving the plugging and vehicle speed signals and delivering a control signal to the switching means having a duty cycle responsive to the vehicle speed signal.

BRIEF DESCRIPTION OF THE DRAWINGS

For a better understanding of the present invention, reference may be had to the accompanying drawings, in which.

BEST MODE FOR CARRYING OUT THE INVENTION

Figure 1:
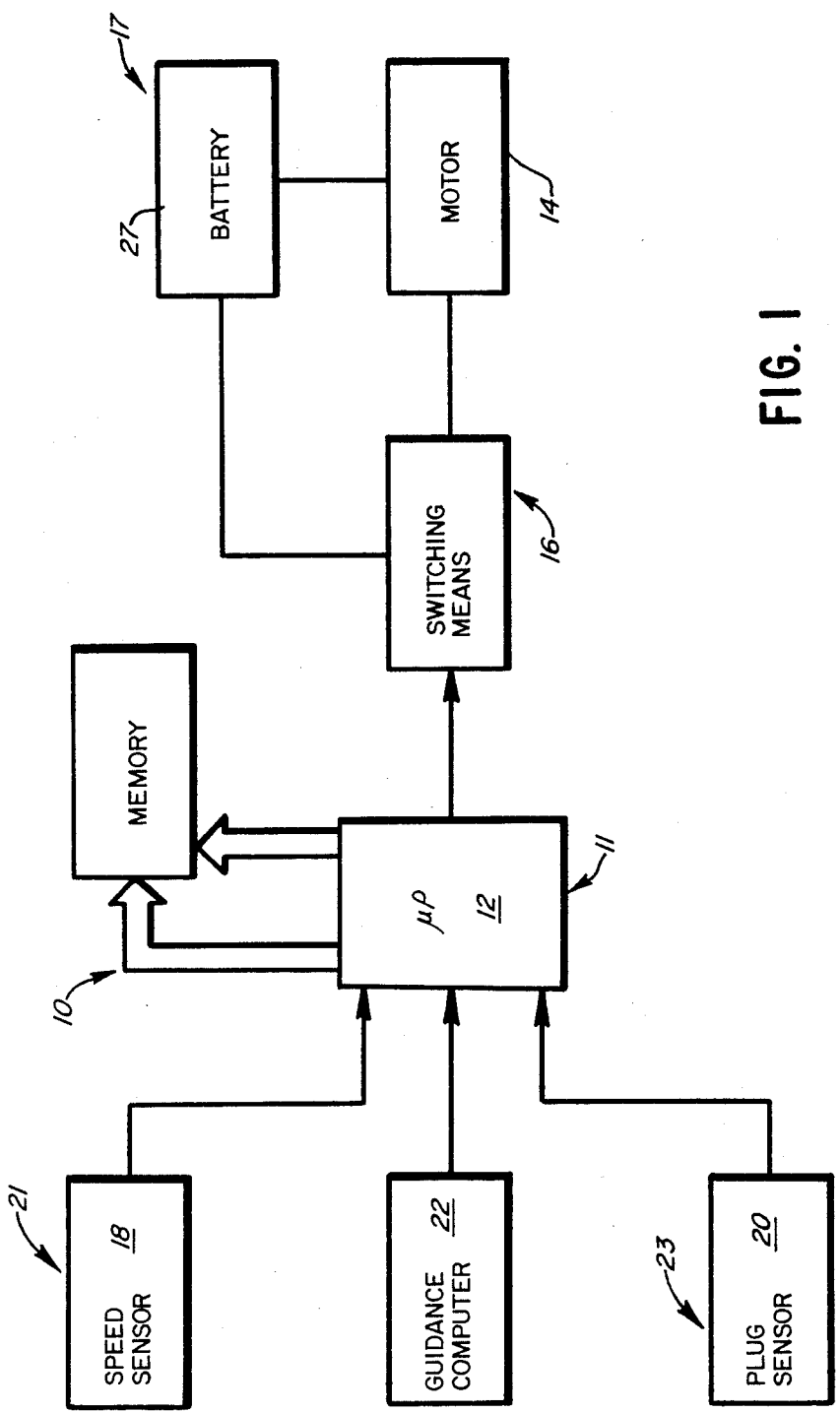
FIG. 1 represents a block diagram of an embodiment of the present invention.

Referring now to the drawings, wherein a preferred embodiment of the present apparatus 10 is shown, FIG. 1 illustrates a block diagram of the controller for an automatic guided vehicle (AGV). Operation of the apparatus 10 is governed by a control means 11 which includes a microprocessor 12 operating under software control. The software which controls operation of the plugging portion of the apparatus 10 is discussed in conjunction with the flow chart of FIG. 4.

Figure 2:
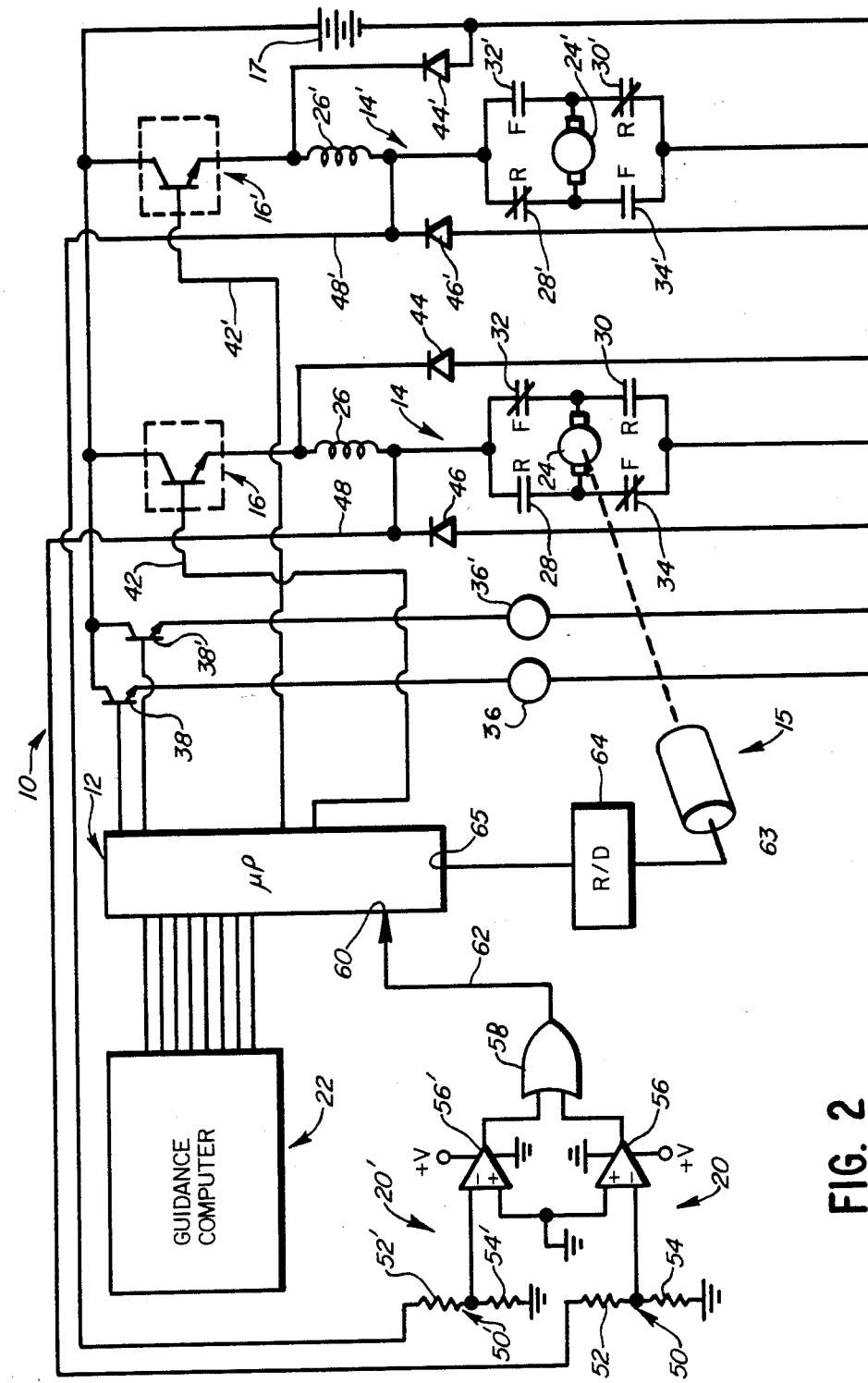
FIG. 2 is a schematic illustration of an overall motor control system having the present invention.

The microprocessor 12 ultimately controls energization of an electric drive motor 14 through a controllable switching means 16. As is shown in FIG. 2, the switching means 16 controllably interconnects a source of electric power 17 and drive motor windings 26,24 in response to receiving a control signal delivered by the microprocessor 12. The motor 14 is preferably a DC series wound motor connected to the source 17 via the switching means 16. The means 16 preferably includes a transistor based chopper circuit capable of supplying a preselected average power to the motor 14 as a function of the duty cycle of the control signal. The source of electric power 17 is preferably a DC storage battery 27.

Proper control of the motor 14 during plugging requires information from a pair of sensors 18,20. A means 21 which includes the speed sensor 18 delivers a signal to the microprocessor 12 where the duty cycle is directly related to instantaneous vehicle velocity. Speed is a necessary piece of information, in that, an AGV requires constant and precise positioning. For example, for the vehicle to approach a target position, the microprocessor 12 will necessarily calculate the distance between the vehicle's current position and the target position. Thus, because the microprocessor 12 "knows" both speed and distance, the desired deceleration rate can be computed. Assuming that the deceleration is linear, the apparatus 10 easily calculates the desired deceleration rate from the current speed and stopping distance using the following equation:

$$a = V^2/d \qquad \text{eqn. 1.1}$$

where,
a = acceleration
V = velocity
d = stopping distance.

A means 23 which includes the plug sensor 20 provides the second piece of required information to the microprocessor 12. The voltage drop across the armature of the motor 14 is monitored to detect plugging. When this voltage appears negative, the microprocessor 12 may properly assume that the motor 14 is being driven in a direction opposite to the direction of energization. Such a condition can only be indicative of plugging. The microprocessor 12 will respond to this input and the speed of the vehicle by controlling the duty cycle of the switching means 16 to provide the desired deceleration.

Alternatively plugging need not be directly sensed by monitoring armature voltage. Because the apparatus 10 is in complete control of the vehicle and "knows" the direction and speed, it will inherently recognize when the vehicle is in a plugging condition. For example, if the direction of energization of the motor 14 changes while the vehicle is moving, the microprocessor 12 recognizes that the vehicle is plugging. Optionally, since the speed sensor is also capable of delivering information on the direction of movement and the apparatus 10 "knows" the direction of energization, plugging may be assumed when direction of movement does not correspond to direction of energization. The means 23 can include the software and hardware described herein for indirectly determining plugging without monitoring motor voltage.

A guidance computer 22 is also located on board the AGV to establish a telecommunications link to a central computer (not shown). The central computer provides routing information and stopping positions to the individual AGV's and can simultaneously control several vehicles. The guidance computer 22 is responsible for calculating and delivering desired deceleration rates to the microprocessor 12 to achieve stop positions. Moreover, the guidance computer also continuously collects information on the current position of the AGV by a combination of referencing the position of known objects and dead reckoning.

Referring now to FIG. 2, wherein an electrical schematic of the apparatus 10 is illustrated. The preferred embodiment of the AGV is a three wheeled vehicle with a pair of separately controllable drive motors 14,14' providing power to the rear drive wheels. A single electrically steerable front wheel provides directional control and is linked to an electronic resolver 15 for speed and position information. The drive motors 14,14' and controllable switching means 16,16' utilize like components and, correspondingly, only one of the drive motors 14,14' and associated components will be discussed herein. Operation and construction of the second motor 14' can be considered substantially identical to the first motor 14.

The motor 14 includes an armature 24 and field winding 26 controllably interconnected by a pair of normally open contactors 28,30 and a pair of normally closed contactors 32,34. The contactors 28,30;32,34 provide control of the direction of energization. For example, in the illustrated condition the normally closed contactors 32,34 provide for the flow of current through the armature 24 in such a direction as to urge the vehicle in the forward direction. Alternatively, closing the normally open contactors 28,30 reverses the flow of current in the armature 24, urging the vehicle in the reverse direction. Control of the pairs of contactors 28,30;32,34 is mutually exclusive and effected by energization of a solenoid 36.

Energizing the solenoid 36 is accomplished under software control by the microprocessor 12. A switching element 38 is disposed intermediate the vehicle battery 17 and the coil 36. Closing the switching element 38 energizes the coil 36 which closes the normally open contacts 28,30 and opens the normally closed contacts 32,34. The switching element 38 is preferably of the transistor type and includes a conventional npn type transistor having a collector connected to the battery 17, an emitter connected to the solenoid 36, and a base connected to an output of the microprocessor 12.

The motor 14 is connected to the vehicle battery 17 through the switching means 16. The switching means 16 is also of the transistor type and includes a conventional darlington pair with the base biasing voltage being ultimately provided by the microprocessor 12 over a line 42. It is readily apparent that the speed of the motor 14 is related to the average power delivered through the controllable switching means 16. Such average power is a direct function of the duty cycle of the biasing voltage on the line 42. Controllably varying the duty cycle of this signal results in controlled changes to the speed of the vehicle. Similarly, controlled variations of the duty cycle of the control signal during plugging results in controlled changes of the electrical braking torque.

A flyback diode 44 is connected across the motor 14, as shown, and is conventional in the art. A plugging diode 46 is connected in parallel with the armature 24, and is forward biased during a plugging condition. During plugging, current flows along a path including the armature 24 and plugging diode 46. A line 48 interconnects the cathode of the plugging diode to the plug sensor 20. The line 48 is connected to a voltage divider circuit 50 consisting of a pair of serially connected resistors 52,54. The connection point of the resistors 52,54 provides a voltage level signal to the inverting input of an operational amplifier 56. The non-inverting input of the amplifier 56 is connected to system ground, while its output is connected to one input of an OR gate 58. The second input of the OR gate 58 is connected to the output of the complementary plug sensor 20' such that plugging of either motor 14,14' will result in a "high" signal being delivered by the OR gate 58. An input port 60 of the microprocessor 12 is connected to the output of the OR gate 58 via a line 62. Thus, the microprocessor determines the presence of a plugging condition by monitoring the input port 60.

In response to plugging of the motor 14, a negative voltage is developed on the line 48. Accordingly, the voltage divider 50 produces a negative voltage at the inverting input of the amplifier 56. The amplifier 56 will be biased "on" owing to the non-inverting input being at a higher potential than the inverting input. Thus, the amplifier 56 develops a "high" signal which is passed by the OR gate 58. Conversely, in the absence of plugging, positive battery voltage develops on the line 48 such that the amplifier 56 is biased "off". Accordingly, a "low" signal is delivered to the microprocessor 12.

Figure 3A:
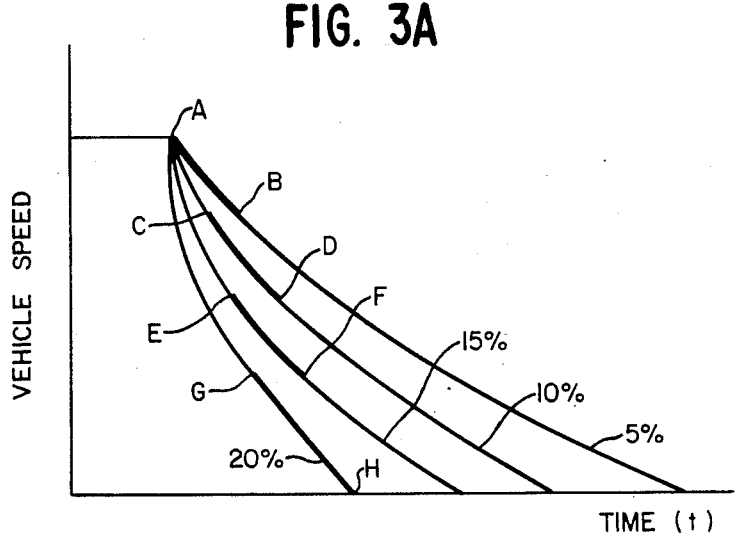
FIG. 3A illustrates a graphical representation of electrical braking at preselected duty cycles.

Referring now to FIG. 3A, wherein a graphical representation of electrical braking at four distinct duty cycles is illustrated. The graph represented herein is intended to be indicative of a generalized electric vehicle and is not an exact reproduction of any particular vehicle. Those skilled in the art will recognize that general curves may be established for a family of vehicles; however, variations between individual vehicles can be expected owing to differences in motor characteristics, gear ratios, vehicle mass, load mass, etc. The deceleration curves correspond to the duty cycle of the signal applied by the microprocessor 12 over line 42 to the controllable switching means 16. Curves for duty cycles of 5%, 10%, 15%, and 20% are illustrated, but correspondingly more or less can be used to respectively increase or decrease the linearity of the vehicle deceleration.

Each of the curves has a portion over which a line can be approximately fitted which has a preselected linear slope. The slope of the line directly corresponds to the vehicle deceleration rate. For example, the line segments AB, CD, EF, & GH each have a substantially identical slope and correspond to an approximately linear region of each curve. The line segments taken as a whole correspond to the entire range of vehicular speed. Thus, for any possible vehicular speed a duty cycle can be selected which will cause the preselected deceleration rate. By providing feedback of the vehicle speed it is possible to adjust the duty cycle to maintain the preselected deceleration as the vehicle slows. Moreover, additional graphs are provided which select linear segments of a different preselected slope. Each graph then corresponds to a particular deceleration rate and once the desired deceleration is computed it is only a matter of selecting the proper graph.

Figure 3B:
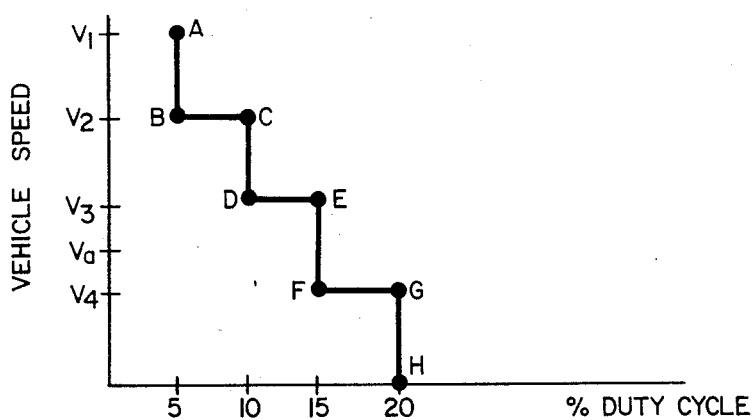
FIG. 3B illustrates a graphical representation of vehicle speed versus % duty cycle for a preselected linear deceleration.

In FIG. 3B the vehicle speed versus % duty cycle is graphed, producing a stairstep type map. One can readily envision that by using additional curves and correspondingly shorter line segments the map would more closely approach the desired linear deceleration. However, owing to the speed feedback, the desired deceleration rate is continually updated such that any error in deceleration is accounted for and mitigated. For example, if the desired deceleration rate is momentarily exceeded, subsequent calculations of the desired deceleration rate will be reduced. The converse is also true, a deceleration rate less than the desired rate increases subsequently calculated desired deceleration rates. A plurality of maps similar to that illustrated in FIG. 3B, with each map corresponding to a different deceleration rate are programmed into nonvolatile memory and accessible by the microprocessor 12.

The microprocessor 12 computes the desired deceleration rate, as previously discussed, accesses the appropriate map, and uses the instantaneous vehicle speed to determine the appropriate duty cycle. For example, if vehicle speed is between the values $V_2$ and $V_3$, then a 10% duty cycle signal is output to the controllable supplying means 16. The output will remain at 10% until either the desired deceleration rate changes or the vehicle speed falls below $V_3$. In the latter instance the duty cycle will be altered to 15%. In the former, the microprocessor will similarly access an alternate map which corresponds to the new deceleration rate. The process repeats until the targeted stopping position is reached.

Figure 4:
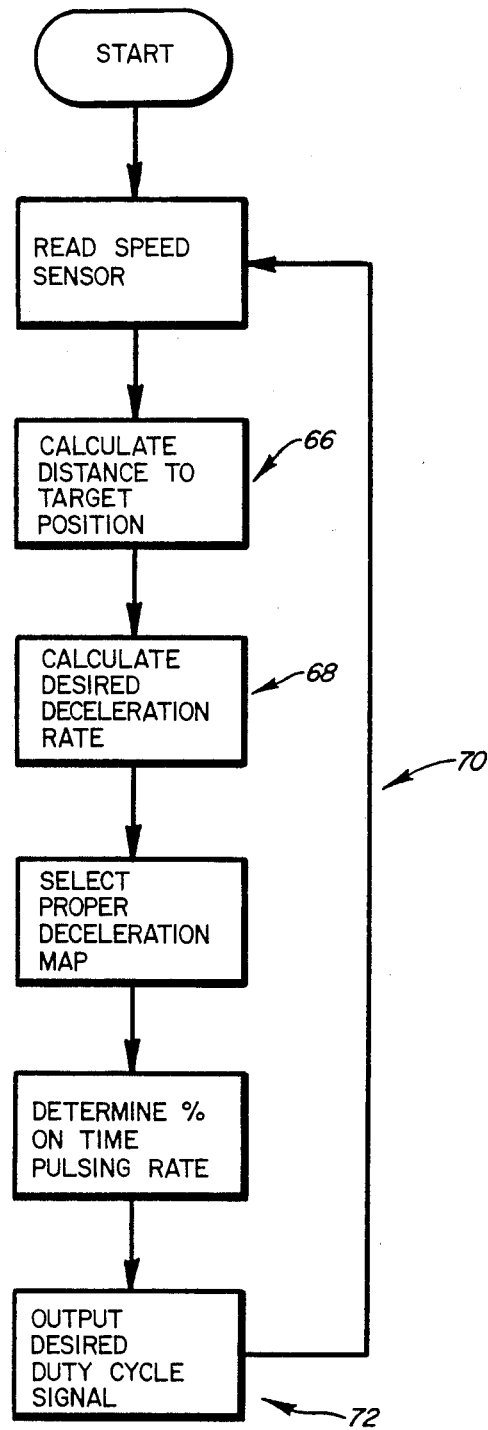
FIG. 4 illustrates a flowchart representation of an embodiment of the present invention.

Referring now to FIG. 4, a flowchart representation of the plugging subroutine is illustrated. During normal operation the central computer will detect the vehicle approaching a stopping point and provide the stopping position to the guidance computer 22. This information is shared with the microprocessor 12 which acts to begin electrical braking of the vehicle. The energization of the solenoid 36 is reversed from its present state, causing the contactors 28,30;32,34 to reverse the flow of current through the armature 24. The microprocessor 12 initially detects a "high" signal on the input port 60 and calls the plugging subroutine to begin controlled deceleration to final stop.

The instantaneous vehicle speed is a required element for calculating the desired deceleration rate. The input port 65 is referenced to access the resolver signal and determine vehicle speed from the period of the resolver signal's least significant bit. Similarly, the distance to the targeted stopping position is also a required element and is calculated by a means 66 from the current position and target position provided by the guidance computer 22. The means 66 calculates the desired vehicle stopping distance in response to receiving the plugging signal. The desired deceleration rate is then calculated using equation 1.1 in response to receiving the work vehicle speed signal.

Using the calculated deceleration rate, a means 70 accesses one of the plurality of deceleration look up tables corresponding to the calculated deceleration rate and retrieves the control signal duty cycle value corresponding to the magnitude of the work vehicle speed signal. Because the apparatus 10 is governed by a system of discrete maps, it is likely that the calculated deceleration rate will not have a directly corresponding look up table. Depending upon the needed accuracy, one of the two approaches can be maintained. First, a rounding or truncating method can be used to select the map which most closely approximates the desired deceleration rate. Progressive iterations through the plugging subroutine will continually recalculate the deceleration rate and adjust the delivered duty cycle. While at any particular point in time the actual and desired deceleration rates may differ, over the entire deceleration period the average actual deceleration will closely approximate the desired deceleration.

Second, a system requiring a higher degree of accuracy during deceleration can interpolate between the two closest maps. For example, the maps for deceleration rates immediately less than and greater than the desired deceleration rates are both accessed. A value between the two retrieved values is calculated based upon the desired deceleration rate. Such a method will produce a vehicle deceleration rate which more closely approximates the desired rate throughout the deceleration period.

From the deceleration map, the vehicle speed is used to look up the appropriate percentage on time pulsing rate. For example, using the map in FIG. 3B, a vehicle speed of $V_2$ will result in a 15% duty cycle signal. Once the desired duty cycle has been determined, the signal is output by a means 72 on the line 42. The means 72 adjusts the on time of the control signal to correspond to the percentage on time pulsing rate retrieved from the look up table. Control subsequently returns to the beginning of the plug subroutine. The subroutine will continue cycling until the vehicle has come to a stop at the desired point and the guidance computer 22 has ceased all motor action.

Industrial Applicability

In the overall operation of the apparatus 10, assume that the vehicle is approaching a target position and the motor 14 is in the plugging mode. The microprocessor 12 responds to the high signal at the input port 60 and calls the plugging subroutine to electrically brake the vehicle.

Vehicle speed and the distance to the target position are each computed and then used to calculate the desired deceleration rate. The importance of linear deceleration is evidenced by the ease with which the deceleration rate is calculated (eqn 1.1).

The magnitude of the deceleration rate is used to select which of the plurality of deceleration maps is accessed. When the proper map is selected the vehicle velocity is used to look-up the necessary duty cycle. With greater vehicle velocity less excitation is required to produce a fixed armature current. Armature current is directly proportional to electrical braking torque. Thus, as the vehicle slows the duty cycle must be increased to maintain the armature current and braking torque.

The plugging subroutine iteratively repeats until the plugging signal falls to a "low" value when the vehicle stops. Each iteration of the subroutine results in a recalculation of the desired deceleration rate with the new values of vehicle velocity and distance to the target position. Closing the loop on the plugging system compensates for errors introduced by any nonlinear approximations.

Other aspects, objects and advantages of this invention can be obtained from a study of the drawings, disclosure, and appended claims.

I claim:

1. An apparatus for providing substantially constant deceleration of an electric drive work vehicle, comprising:

a battery;

an electric drive motor having a field and armature winding;

switching means for controllably interconnecting the battery and drive motor windings in response to receiving a control signal;

means for sensing work vehicle speed and delivering a signal correlative to the work vehicle speed;

means for detecting plugging of the drive motor and delivering a signal in response thereto;

means for calculating a desired vehicle stopping distance in response to receiving the plugging signal and delivering a signal having a magnitude responsive to the desired vehicle stopping distance;

means for receiving the work vehicle speed signal and the desired vehicle stopping distance signal, calculating a desired linear deceleration rate responsive to the magnitudes of the received signals, and delivering a signal responsive to the magnitude of the desired linear deceleration rate;

a plurality of look up tables each having a plurality of control signal duty cycle values corresponding to a plurality of vehicle speed values, each of the look up tables corresponding to a preselected unique deceleration rate;

means for accessing the look up table corresponding to the desired linear deceleration rate and retrieving the control signal duty cycle value corresponding to the magnitude of the work vehicle speed signal; and means for delivering the control signal to the switching means having a duty cycle responsive to the retrieved duty cycle value.

* * * * *